United States Patent Office

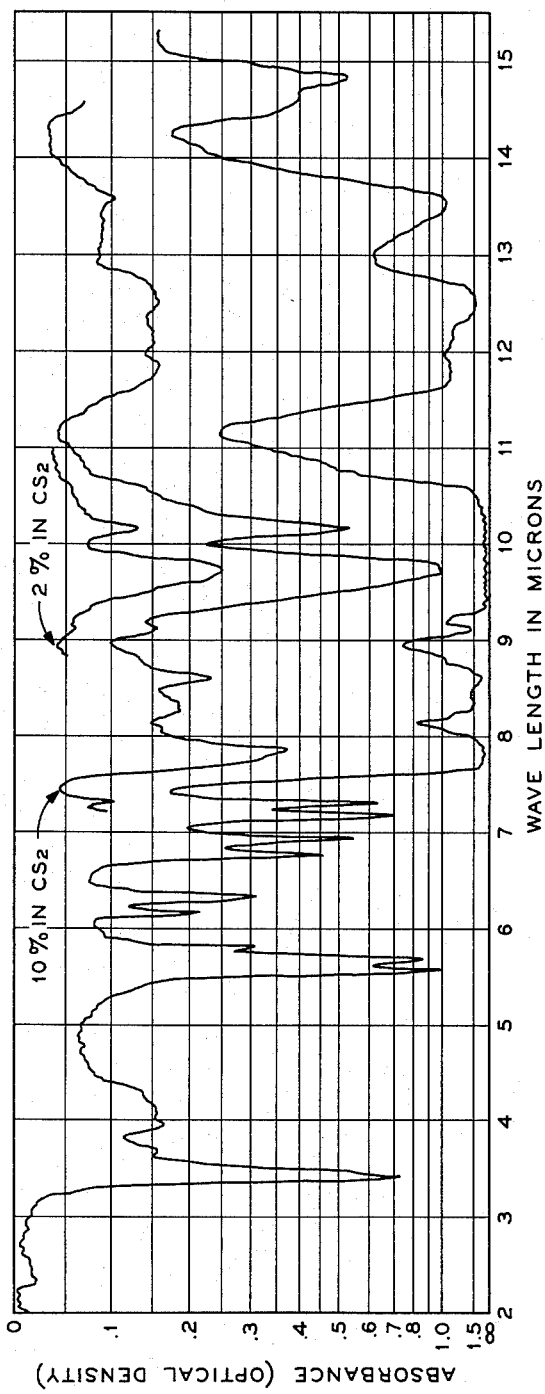

2,983,645
Patented May 9, 1961

2,983,645

REACTION PRODUCT OF TRIETHYL PHOSPHITE AND TRICHLOROACETYL CHLORIDE AS AN INSECTICIDE

Martin J. Diamond and Gustave K. Kohn, Berkeley, Calif., assignors to California Research Corporation, San Francisco, Calif., a corporation of Delaware Filed Oct. 1, 1956, Ser. No. 613,269

3 Claims. (Cl. 167—22)

This invention relates to a unique reaction product which is of particular value as a toxicant and useful in the formulation of insecticidal compositions.

It was discovered that a unique toxicant of unusual insecticidal activity may be obtained by the reaction of trichloroacetyl chloride and triethyl phosphite with the evolution of ethyl chloride. This reaction product apparently consists of a complex mixture of organic phosphorus compounds from which no major chemical component has been isolated.

The reaction of trichloroacetyl chloride and triethyl phosphite apparently involves a complex reaction mechanism which theoretically may follow both the Arbuzov and the Perkow reactions in addition to other secondary reaction. Process variables in the conduct of the reaction may be modified over a considerable range without a material change in composition of the resulting reaction product, at least as measured by biological activity. The reaction proceeds as an exothermic rate reaction and may be conducted at temperatures in the range of about 0° to 120° C. at atmospheric pressures. Within this temperature range, optimum biological activity has been noted in the reaction products produced at the higher reaction temperatures, preferably in the range of 80° to 110° C. Generally, the reaction is conducted with substantially equimolar quantities of the reactants with preference given to the use of a slight molar excess of triethyl phosphite.

In a representative preparation of the reaction product, 182 grams of trichloroacetyl chloride were introduced into a condensation vessel equipped with reflux condenser, agitator and dropping funnel. This material was then heated to 105° C., at which temperature a total of 175 grams of triethyl phosphite (5% excess over theory) were added slowly so that the temperature remained at approximately 105° C. Ethyl chloride was liberated and 289.8 grams of the resulting crude reaction product were obtained, corresponding to 99% of theory. The refractive index of the crude reaction product, $n_D^{23}$, was 1.4589. An aliquot of this reaction product was then removed and subjected to vacuum distillation. The following table summarizes the physical properties of the fractions collected, recalculated for the total yield.

Table I

| | Pot Temp., °C. | Vapor Temp., °C. | Pressure, mm./Hg | Grams | Wt. Percent | $n_D^{23}$ |
|---|---|---|---|---|---|---|
| Forerun | <66 | <24 | 0.4–0.3 | 28.4 | 9.8 | 1.4652 |
| Fraction A | 66–88 | 24–44 | 0.3 | 32.7 | 11.3 | 1.4148 |
| Fraction B | 88–123 | 44–109 | 0.3–0.5 | 12.6 | 4.3 | 1.4108 |
| Fraction C | 123–150 | 109 | 0.4 | 109.0 | 37.6 | 1.4632 |
| Fraction D | >150 | | 0.4 | 90.1 | 31.1 | 1.4763 |

While the foregoing distillation of the reaction product indicates a heterogeneous mixture boiling over a wide range, the fractional concentrations, indicative of composition variation, do not materially change under varying conditions of preparation. On the basis of examination of multiple preparations of the subject reaction product, the following ranges of concentration have been observed on distillation of the crude reaction product at pressures of 0.2 to 0.4 millimeter mercury:

| Wt. Percent | Pot Temp., °C. | Vapor Temp., °C. |
|---|---|---|
| 7–13 | <65 | <65 |
| 9–15 | 65–90 | 25–45 |
| 1–7 | 90–125 | 45–100 |
| 35–40 | 125–150 | 95–105 |
| 30–35 | >150 | |

The identification of the subject reaction product is exemplified by the spectrograms reproduced in the appended figure. These spectrograms were prepared on a standard infrared recording spectrophotometer designed for measuring and recording the infrared transmission of solids, liquids and gases and consisting of a double infrared beam which scans the spectrum through the wave length from 2.0 to 15+ microns, one part of the beam passing through the sample under study and the other passing through a compensating cell. In the composite spectrogram of the figure, the principal spectrogram was obtained on the undiluted compound employing a 0.03 millimeter NaCl cell, whereas the other records were obtained from 2% and 10% solutions thereof in carbon disulfide as indicated.

The P→O, P—O—Et, and P—O—C bonds are evident at approximately 7.8, 8.7, and 9.7μ. Three moderately strong peaks appear between 5.5 and 5.8μ, and two peaks at 6.2 and 6.3μ. Additional bands in the region around 8.3, 12.15, 14.6 and 14.8μ are also representative of the composition of the reaction product. No direct structural interpretation of a number of these bands can be made, but the gross differences between the spectrograms of the crude reaction product and postulated organic phosphorus compounds which theoretically may result from the subject reaction confirm the conclusion that the subject reaction product consists of a substantially uniform mixture of complex organic phosphorus compounds.

The unique biological activity of the crude reaction product, and particularly its miticidal activity, has been demonstrated by extensive biological testing on two-spotted mites, *Tetranychus bimaculatus* Harvey, in comparison with tests on the fractional components of the reaction product identified in the foregoing example and table. On the basis of the data obtained, the following LD–50 was determined for the crude and each of the components under test:

LD–50
(p.p.m.)
Crude reaction product _____ 1.8
Fraction A _____ 9.0
Fraction B _____ 34.0
Fraction C _____ 4.5
Fraction D _____ 21.0

It will be noted that the crude reaction product is considerably more active than any of the fractions which could be isolated therefrom.

On the basis of these data, the activity which may be ascribed to each of the components of the reaction product was determined and tabulated as in the following table. The percent of activity of each of the fractions was determined by dividing the LD–50 p.p.m. of the crude reaction product by the p.p.m. of the individual fraction and multiplying by 100. The resulting value is the measure of biological activity of each of the fractions based on the crude reaction product. This value is then multiplied by the percent composition of each of the fractions as shown by the distillation data and the resultant figure is the relative biological activity which may be ascribed to each fractional component of the reaction product. Assuming the biological activity of the reaction product to be an aggregation and an addition of the biological activity of the fractional components, the summation of the relative activity of all the fractions should equal the activity of the crude.

Table II

|  | A | B | A×B |
|---|---|---|---|
|  | Dist., Wt. Percent | Bio-Assay, Percent Activity Based on Crude | Activity of Isolated Components Corrected to Concentration |
| Crude reaction product | 100.0 | 100.0 | 100.0 |
| Forerun | 9.8 | | |
| Fraction A | 11.3 | 20.0 | 2.26 |
| Fraction B | 4.3 | 5.3 | 0.23 |
| Fraction C | 37.6 | 40.0 | 15.04 |
| Fraction D | 31.1 | 8.6 | 2.67 |
| Handling loss | 5.9 | | |
| Totals | 100.0 | | 20.20 |

As exemplified from the above calculations respecting the biological activity of each of the distilled components corrected to concentration, it is determined that the biological activity of the crude reaction product is almost five times as great as the activity obtained by the summation of the fractions that could be isolated. These results are typical of many attempts at isolation of individual components and illustrate the unique acaricidal characteristics of the reaction product.

Obviously, many modifications and variations of the invention as hereinbefore set forth may be made without departing from the spirit and scope thereof, and therefore only such limitations should be imposed as are indicated in the appended claims.

We claim:
1. A reaction product of the reaction of trichloroacetyl chloride and an amount from an equimolar proportion to a slight molar excess of triethyl phosphite at a temperature in the range of about 80°–110° C. under conditions resulting in the evolution of ethyl chloride.

2. A method of preparing a toxicant composition which comprises reacting trichloroacetyl chloride and an amount from an equimolar proportion to a slight molar excess of triethyl phosphite at a temperature in the range of about 80°–110° C. under conditions resulting in the evolution of ethyl chloride.

3. An insecticidal composition comprising an inert insecticidal adjuvant and a toxic concentration of the reaction product of the reaction of trichloroacetyl chloride and an amount from an equimolar proportion to a slight molar excess of triethyl phosphite at a temperature in the range of about 80°–110° C. under conditions resulting in the evolution of ethyl chloride.

References Cited in the file of this patent

UNITED STATES PATENTS 2,491,920    Ernsberger    Dec. 20, 1949

FOREIGN PATENTS 303,952    Switzerland    Mar. 1, 1955

OTHER REFERENCES

Perkow et al.: "Naturwiss.," vol 39, page 353 (1952).

Barthel et al.: "J. Am. Chem. Soc.," vol. 77, pages 2424–7 (1955).